Patented Nov. 8, 1949

2,487,069

UNITED STATES PATENT OFFICE 2,487,069

BAKED FOOD COMPOSITIONS

Sidney Musher, New York, N. Y., assignor to Musher Foundation Incorporated, New York, N. Y., a corporation of New York No Drawing. Application July 31, 1945, Serial No. 608,093

8 Claims. (Cl. 99—92)

The present invention relates to methods for obtaining increased yields and volume of bakery food compositions and particularly of cakes containing both shortening and eggs such as sponge cake.

It is of the utmost desirability to obtain cakes which not only have more weight per pound of baked cake, but which also have the maximum volume without increasing tendencies towards staleness or drying out.

It is an object of the present invention to produce increased yields in baked food compositions both as regards weight and volume, and whereby the baked cake exhibits reduced tendencies towards moisture loss and staleness.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the procedure of the present invention it has been found that the special oat fraction, when used in a minor amount, in cakes, and particularly in sponge cake, has the effect of increasing the volume or of aerating the cake so as to produce much higher volume, which increase in volume takes place during baking thereby giving the cake a stabilized physical cellular structure.

This special oat fraction is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. This is desirably accomplished by drying the oats with their hulls to reduce the moisture content in order more readily to remove the hulls from the oats. The oat groats thus obtained are then specially processed to remove the relatively high starch fraction and to concentrate the relatively high protein fraction thereof, obtaining a fraction which contains desirably in excess of about 20% protein and most desirably in excess of 22% protein.

In treating these oat groats to obtain the special oat fraction the groats are pulverized desirably in an attrition mill to such an extent that about 85% to 95% will pass through a screen or mesh or bolting cloth having a fineness in excess of about 60 mesh and desirably having a fineness in excess of 70 mesh.

The oat groats are ground as indicated above and the ground groats are then separated desirably by aspirating or otherwise by screening into two fractions, namely, a coarse fraction and a fine fraction, the coarse fraction comprising the minor fraction of less than about 15% by weight and most desirably comprising 5 % to 15% of the total weight of the ground oat groats and the fine fraction comprising at least 85% and most desirably between about 85% and 95% of the total weight of the ground oat groats.

The coarse residue which is left after such grinding and screening or bolting or particularly after aspirating is then ground to a fineness of at least 50 mesh and most desirably to at least 60 mesh and preferably to over 90 mesh.

In the preferred procedure, the oat groats, after removal of the hulls, are pulverized or ground and then desirably by aspirating or less preferably by bolting or screening the relatively high starch containing oat fraction is removed. The pulverized oat groats may, for example, be aspirated to separate the minor fraction of the relatively low starch and relatively high protein containing materials. This process may where desired be continued by regrinding, rescreening or reaspiration until the relatively high starch material has been largely removed leaving the relatively high protein fraction, this fraction to be ground to at least 50 mesh.

The coarse fraction obtained will generally have a protein content in excess of 20% and more desirably in excess of 22%. At the same time the starch content of the coarse fraction will be reduced to much less than the starch content of the fine fraction.

According to one method of separating the relatively high starchy fraction which is necessary to obtain the gelatinous properties in most highly developed condition, the groats are ground so that at least about 85% will have a fineness in excess of about 60 mesh and desirably at least 60% to 70% of the ground material will have a sufficient fineness to go through about a 90 mesh screen.

Then the ground material is aspirated or less preferably screened to remove all particles which will not go through a 60 mesh screen.

A most highly desirable method is to grind the oat groats until between 85% and 90% will go through a 70 mesh screen but wherein the balance of between 10% and 15% remains on the screen. Then the ground groats are aspirated or screened to remove all the coarse particles and to separate the fine fraction comprising 85% to 90% from the coarse fraction comprising the balance of 10% to 15%.

The oat material which goes through the screen or the fine material which is aspirated will contain the relatively high starch fraction whereas the material left behind on the screen or the coarse fraction thereof will be relatively low in starch content.

This coarse, relatively low starch and relatively high protein material must be finely divided and is then used in accordance with the procedures of the present invention.

These coarser particles are ground such as in a hammer or stone or attrition mill to a particle size of at least 50 mesh and more desirably so that all of the coarse particles will go through at least a 60 mesh screen. This may be accomplished by first grinding the coarse particles and separating that fraction which will go through a 60 or more mesh screen followed by regrinding the remaining coarse portion and continuing the grinding and separating until all of the coarse fraction has been ground to a point where the entire coarse fraction will go through at least a 60 mesh screen.

Although the chemical composition may vary it has been found that 20% protein should be present and most desirably 22% protein. Highly desirable materials have been made containing 25% to 29% protein.

It has been found possible, where desired, to bleach this special oat fraction with chlorine or hypochlorite to lighten its color. It is also possible to obtain this bleaching effect with reducing agents such as sulfites but these reducing agents are not as effective as the oxidizing bleaching agents.

In accordance with the present invention, the finely divided special oat fraction has been found to have remarkable "lifting power" or aerating effects producing increased volume when incorporated as an ingredient and in a small amount of between 0.5% and 5% and desirably between 2% and 4% in cake batters which are then baked.

This is particularly surprising in view of the fact that in other food compositions, the finely divided special oat fraction has the effect of reducing volume and giving the opposite effect to aeration.

The finely divided special oat fraction may be mixed with the flour and then incorporated in the batter in the normal manner. It may be employed in normal baking procedures or may be incorporated in dry cake mixes which contain all the ingredients required for baking, needing only the addition of water, mixing and baking.

The wheat flour or so called cake flour content may be reduced by about 10% to 30% and desirably about 15% to 20% when using the finely divided special oat fraction as an ingredient in the cake mix.

It is particularly desirable for the batter containing the finely divided special oat fraction to be allowed to stand for about two to three times as long as in normal baking procedures. For example, instead of the cake batter being allowed to stand for about five minutes before baking, a time interval of at least about ten to fifteen and up to thirty minutes is desirable.

Among the other ingredients of these cake mixes there may be included shortening as for example fats and oils, butter, hydrogenated shortening, etc., flour, eggs including fresh, frozen or dried egg yolks, whites or whole eggs, baking powder, flavor, sugars, and other normal ingredients.

Although egg whites have the effect of increasing volume in baked food products and although the finely divided special oat fraction when added to egg whites followed by beating reduces materially the volume obtained by using egg whites alone, nevertheless when both the finely divided special oat fraction and egg whites are incorporated in a cake batter, the cake after baking has greatly increased volume and at the same time a higher yield, higher moisture content, more weight after baking, less tendency toward staleness and better eating qualities.

For example, sponge cakes were made of the following ingredients:

|  | Cake A | Cake B |
| --- | --- | --- |
|  | Ounces | Ounces |
| Eggs | 5 | 5 |
| Sugar | 3 | 3 |
| Flour | 3 | 2½ |
| Hydrogenated shortening | 1 | 1 |
| Water | ½ | ½ |
| Finely divided special oat fraction | None | ½ |

The volume of cake B was about 14% greater, the weight per unit of dry ingredients present was 8.3% higher and furthermore cake B had much superior eating qualities, better crumb, and had a finer texture.

Apparently the finely divided special oat fraction when used in bakery products and particularly where eggs are also employed, has the effect of giving increased "lift" to the batter during baking and also of holding the air after the bakery product is removed from the oven.

The finely divided special oat fraction may also be used in conjunction with soy or peanut protein or other similar egg white substitute whereby the finely divided special oat fraction holds the air incorporated by the soy or peanut protein and prevents the cake after removal from the oven from losing all the air incorporated in it during the baking procedure.

The baked food compositions of the present invention are those in which the finely divided special oat fraction is incorporated in a small amount as an ingredient thereof and in which the oven baking temperature is at least about 250° F. Furthermore the baked food composition is of such character that air pockets are developed within the baked food during the baking procedure and which air pockets are interlaced by flour, gluten or other normal constituents of the baked food product.

Although the finely divided special oat fraction exhibits its best effect in sponge cakes, it may also be used in pound cake, layer cake, white cakes, muffins, biscuits, rolls, bread, pancakes and similar bakery products as well as in dry cake mixes, biscuit mixes, pancake flours and with similar dry cereal ingredients to be baked or where lifting power in a cellular baked cereal food product is desired these products when baked referred to herein as cellular baked cereal food products.

Where desired, the fat may be extracted from the finely divided special oat fraction such as by treatment of the special oat fraction or of the finely divided special oat fraction with a fat solvent. Among the fat solvents that are desirably used are included the volatile hydrocarbon solvents such as benzine, hexane, N-pentane, etc., as well as acetone which has been found highly satisfactory. There may also be very desirably used the low molecular weight aliphatic alcohols, particularly isopropyl alcohol but including also methanol, ethanol or propanol.

Among the other solvents that may be employed are carbon tetrachloride, carbon disulphide, dichlorethylene, trichlorethylene, dichlorethylether or similar fat solvents or combinations of any of the above may also be employed. Other fat soluble solvents may also be utilized and it is desirable for a maximum amount of the fat to be removed as would be done in any normal commercial procedure.

It is considered preferable to extract the special coarse oat fraction prepared in the manner indicated above although the coarser particles may first be ground before subjecting to fat extraction. The extracted product is then very readily pulverized as to 100 or more mesh.

By the term "finely divided" as used in connection with the special oat fraction of the present invention in the application and claims is meant the oat fraction which has been subdivided to a state of fineness that will enable it to go through at least about a 50 mesh screen.

By the term "dry milled oat product" as used in the present application and claims is meant an oat product which has been subjected to either grinding, screening, bolting, aspirating or combinations thereof or even to oil solvent extraction.

By the term "total protein" is meant the total amount of protein present in the special oat fraction of the present invention.

In the production of the special oat fraction the whole oats may also be dehulled in their "green" or undried condition, which is quite different from the operation normally utilized in dehulling procedures and particularly in the dehulling of oats. In other words, the oats may not be subjected to any drying or desiccating or roasting procedures as is commonly done in the treatment of whole oats before the hulls are removed.

Where, however, the whole oats are to be dried from, for example, 12% to 13% moisture content to 6% to 7% or less of moisture content, it is preferable for the drying operation to be carried out at a temperature not exceeding about 170° F. and preferably not exceeding about 150° F. Roasting of the oats or drying of the oats at a temperature of over 170° F. is preferably to be avoided.

Having described my invention what I claim is:

1. A sponge cake comprising a relatively small amount of the finely divided coarse fraction of dehulled oats, said fraction having a fineness of at least about 60 mesh, said fraction containing in excess of about 20% total protein, said fraction being free of those particles which will go through a 60 mesh screen when the dehulled oats are pulverized to a fineness that will permit 85% to 95% thereof to pass through a 60 mesh screen.

2. A cake product containing shortening and eggs comprising a relatively small amount of the finely divided coarse fraction of dehulled oats, said fraction having a fineness of at least about 60 mesh, said fraction containing in excess of about 20% total protein, said fraction being free of those particles which will go through a 60 mesh screen when the dehulled oats are pulverized to a fineness that will permit 85% to 95% thereof to pass through a 60 mesh screen.

3. A method of making a sponge cake which comprises adding to a cereal flour dough containing shortening and eggs a relatively small amount of the finely divided coarse fraction of dehulled oats, said fraction having a fineness of at least about 60 mesh, said fraction containing in excess of about 20% total protein, said fraction being free of those particles which will go through a 60 mesh screen when the dehulled oats are pulverized to a fineness that will permit 85% to 95% thereof to pass through a 60 mesh screen.

4. A method of making a cake containing shortening and eggs which comprises adding to a cereal flour dough a relatively small amount of the finely divided coarse fraction of dehulled oats, said fraction having a fineness of at least about 60 mesh, said fraction containing in excess of about 20% total protein, said fraction being free of those particles which will go through a 60 mesh screen when the dehulled oats are pulverized to a fineness that will permit 85% to 95% thereof to pass through a 60 mesh screen.

5. A sponge cake comprising a relatively small amount of the finely divided, substantially fat free, coarse fraction of dehulled oats, said fraction having a fineness of at least about 60 mesh, said fraction containing in excess of about 20% total protein, said fraction being free of those particles which will go through a 60 mesh screen when the dehulled oats are pulverized to a fineness that will permit 85% to 95% thereof to pass through a 60 mesh screen.

6. A cake product containing shortening and eggs comprising a relatively small amount of the finely divided, substantially fat free, coarse fraction of dehulled oats, said fraction having a fineness of at least about 60 mesh, said fraction containing in excess of about 20% total protein, said fraction being free of those particles which will go through a 60 mesh screen when the dehulled oats are pulverized to a fineness that will permit 85% to 95% thereof to pass through a 60 mesh screen.

7. A method of making a sponge cake which comprises adding to a cereal flour dough containing shortening and eggs a relatively small amount of the finely divided, substantially fat free, coarse fraction of dehulled oats, said fraction having a fineness of at least about 60 mesh, said fraction containing in excess of about 20% total protein, said fraction being free of those particles which will go through a 60 mesh screen when the dehulled oats are pulverized to a fineness that will permit 85% to 95% thereof to pass through a 60 mesh screen.

8. A method of making a cake containing shortening and eggs which comprises adding to a cereal flour dough a relatively small amount of the finely divided, substantially fat free, coarse fraction of dehulled oats, said fraction having a fineness of at least about 60 mesh, said fraction containing in excess of about 20% total protein, said fraction being free of those particles which will go through a 60 mesh screen when the dehulled oats are pulverized to a fineness that will permit 85% to 95% thereof to pass through a 60 mesh screen.

SIDNEY MUSHER.

REFERENCES CITED

The following references are of record in the file of this patent:

UNITED STATES PATENTS

| Number | Name | Date |
| --- | --- | --- |
| 1,201,742 | Keyser | Oct. 17, 1916 |
| 1,524,783 | Curtner | Feb. 3, 1925 |
| 2,355,028 | Musher | Aug. 1, 1944 |
| 2,355,030 | Musher | Aug. 1, 1944 |
| 2,355,547 | Musher | Aug. 8, 1944 |

OTHER REFERENCES

U. S. Dept. of Ag., Circ. No. 118, Aug. 14, 1918, pages 3 and 4.